United States Patent Office 3,270,000
Patented August 30, 1966

3,270,000
PROTECTED AMINO ACID DERIVATIVES OF 7-AMINOCEPHALOSPORANIC ACID
Josef Fried and Eugene E. Galantay, Princeton, N.J., assignors, by mesne assignments, to E. R. Squibb & Sons, Inc., New York, N.Y., a corporation of Delaware
No Drawing. Filed Oct. 29, 1962, Ser. No. 233,880
9 Claims. (Cl. 260—112.5)

This invention relates to new derivatives of 7-aminocephalosporanic acid and more particularly to new compounds of the general Formula I:

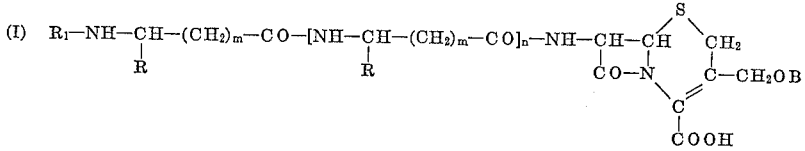

and non-toxic salts thereof; wherein B is hydrogen or acyl, the R's are the same or different and represent hydrogen, lower alkyl, ar(lower alkyl) or heterocyclic-(lower alkyl); $R_1$ is an acyl radical; the $m$'s are the same or different and are zero, one or two; and $n$ is zero, one or two. Particularly preferred are those compounds of Formula I wherein B is hydrogen or the acyl radical of a hydrocarbon carboxylic acid of less than twelve carbon atoms, as exemplified by the lower alkonoic acids (e.g., acetic, propionic, butyric, valeric and caproic acid), the lower alkenoic acids (e.g., 2-butenoic acid), the cycloalkanecarboxylic acids, the cycloalkenecarboxylic acids, the monocyclic ar(lower alkanoic) acids (e.g., phenylacetic and β-phenylpropionic acid), and the monocyclic aryl carboxylic acids (e.g., benzoic and p-toluic acid); R and $m$ are so chosen that:

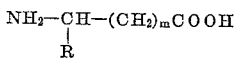

represents a naturally occurring aminoacid, such as one of the twenty-two α-amino acids: alanine, arginine, aspartic acid, cysteine, diiodotyrosine, glutamic acid, glycine, histidine, hydroxylysine, hydroxyproline, isoleucine, leucine, lysine, methionine, phenylalanine, proline, serine, threonine, thyroxine, tryptophan, tyrosine and valine or one of the naturally occurring β or γ-aminoacids, such as β-alanine or γ-aminobutyric acid; $R_1$ is the acyl radical of a hydrocarbon carboxylic acid of less than twelve carbon atoms, such as one of the carboxylic acids mentioned hereinbefore, the acyl radical of a hydrocarbon sulfonic acid of less than twelve carbon atoms, as exemplified by the lower alkane sulfonic acids (e.g., methanesulfonic acid, ethanesulfonic acid and propanesulfonic acid), the lower alkene sulfonic acids, the cycloalkanesulfonic acids, the cycloalkenesulfonic acids, the monocyclic ar(lower alkane) sulfonic acids (e.g., phenylmethanesulfonic acid and β-phenylethanesulfonic acid) and the monocyclic aryl sulfonic acids (e.g., benzenesulfonic acid and p-toluenesulfonic acid), or the acyl radical of a half ester of carbonic acid with a hydrocarbon of less than twelve carbon atoms, as exemplified by the monolower alkyl (e.g., methyl, ethyl and tert-butyl), the monolower alkenyl, the monocycloalkyl, the monocycloalkenyl, the monomonocyclic ar(lower alkyl) (e.g., benzyl and phenethyl), and the monomonocyclic aryl (e.g., phenyl) esters of carbonic acid; and $n$ is zero, one or two.

Among the suitable salts may be mentioned the alkali metal salts (e.g., sodium and potassium), the alkaline earth metal salts (e.g., magnesium), and amine salts, such as tertiary amine salts, as exemplified by the tri-lower alkyl) amines (e.g., triethylamine and trimethylamine) and by heterocyclic amines (e.g., N-methylpiperdine or N-methylmorpholine).

The compounds of this invention (the compounds of Formula I and their non-toxic salts) are physiologically active substances which have a high degree of antibacterial activity against a large number of microorganisms, including Gram positive and Gram negative microorganisms such as *Staphylococcus aureus, Escherichia coli, Klebsiella pneumoniae, Aerobacter aerogenes,* and *Shigella sonnei*. Particularly valuable activity was observed against resistant (penicillinase-producing) strains of *S. aureus*. In addition the compounds of this invention show a particularly pronounced resistance to acids.

The compounds of this invention, wherein B is acetyl, are prepared by interacting 7-aminocephalosporanic acid with a protected amino acid or peptide of the general Formula II:

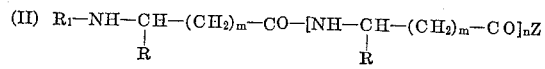

wherein R, $R_1$, $m$ and $n$ are as hereinbefore defined, and Z is a halide (preferably chloride), azide, alkoxycarbonyloxy (preferably lower alkoxycarbonyloxy), imidazolyl, or optimally p-nitrophenoxy. The reaction is preferably conducted in the presence of a base, such as one of the bases listed hereinbefore, in an organic solvent for the reactants. The reaction results in the preparation of compounds of Formula I, wherein B is acetyl, in the form of their salts with the base employed in the reaction.

Compounds II, when new, can be prepared by methods well known in the art from the corresponding acids (Z is hydroxy). Thus, the acid can be treated with thionyl chloride in the presence of dimethylformamide to yield the corresponding acyl chloride (Z is chlorine) and the acyl chloride treated with either sodium azide to yield the corresponding acyl azide (Z is $N_3$) or with p-nitrophenol in the presence of dicyclohexyl carbodiimide to yield the corresponding p-nitrophenyl ester (Z is p-nitrophenoxy); or the acid can be treated with an alkoxycarbonyl chloride (e.g., ethoxycarbonyl chloride) in the presence of pyridine to yield the corresponding anhydride (Z is alkoxycarbonyloxy), or with carbonyldiimidazole to yield the corresponding imidazolyl (Z is imidazolyl).

Among the suitable reactants can be mentioned the N-lower alkanoyl, N-lower alkenoyl, N-cycloalkanecarbonyl, N-cycloalkenecarbonyl, N-monocyclic ar(lower alkanoyl), N-monocyclic aryl carbonyl, N-lower alkanesulfonyl, N-lower alkenesulfonyl, N-cycloalkanesulfonyl, N-cycloalkenesulfonyl, N-monocyclic ar(lower alkane) sulfonyl, N-monocyclic aryl sulfonyl, N-(lower alkoxy) carbonyl, N-lower alkenyloxy) carbonyl, N-cycloalkaneoxycarbonyl, N-cycloalkeneoxycarbonyl, N-monocyclic ar(lower alkoxy)carbonyl and N-monocyclic aryloxycarbonyl amides of amino acids, such as alanine, arginine, aspartic acid, cysteine, diiodotyrosine, gultamic acid, glycine, histidine, hydroxylysine, hydroxyproline, isoleucine, leucine, lysine, methionine, phenylalanine, proline, serine, thereonine, thyroxine, tryptophan, tyrosine, valine β-alanine and γ-aminobutyric acid; dipeptides, such as glycylglycine and glycylphenylalanine; and tripeptides, such as triglycine.

The compounds initially formed, of the Formula I wherein B is acetyl, in the form of their salts, can then be converted to the free acid form in the usual manner, as by treatment with a dilute mineral acid, such as hydrochloric acid, in an aqueous medium and extraction of the free acid into an organic solvent, such as ethyl acetate, with subsequent evaporation of the solvent. Moreover, these compounds can be saponified to yield the free alcohols (B is hydrogen) by enzymatic hydrolysis of the esters. This enzymatic hydrolysis is preferably carried out using orange peel acetyl esterase [Jeffery et al., Biochem. J., 81, 591 (1961)], and the resulting alcohol can then be esterified with a different acylating agent, preferably an acid anhydride or acyl chloride of a hydrocarbon carboxylic acid of less than twelve carbon atoms, to yield the other esters of this inventon.

The following examples illustrate the invention (all temperatures being in centigrade):

*Example 1*

7 - (BENZYLOXYCARBONYLGLYCYLAMINO) C E P H A L - OSPORANIC ACID, TRIETHYLAMMONIUM SALT THEREOF, AND SODIUM SALT THEREOF (FORMULA I, R IS HYDROGEN, R₁ IS BENZYLOXYCARBONYL, B IS ACETYL, $m$ AND $n$ ARE ZERO)

To a suspension of 27.2 mg. of 7-aminocephalosporanic acid in 0.50 ml. of dimethyl formamide there is added, at room temperature, 0.014 ml. of triethylamine and 38.6 mg. of benzyloxycarbonylglycine p-nitrophenyl ester. After 18 hours, 5 ml. of dry ether is added, whereupon about 54.9 mg. of the pure triethylammonium salt of 7-(benzyloxcarbonylglycylamino)cephalosporanic acid crystallizes. To obtain the sodium salt the triethylammonium salt is dissolved in 2 ml. of water, the pH of the solution is lowered to 2.2 by the addition of 5N hydrochloric acid, and the resulting free 7-(benzyloxycarbonylglycylamino) cephalosporanic acid is extracted into methyl isobutyl ketone. To the methyl isobutyl ketone solution water is added, followed with vigorous stirring by enough N/10 sodium hydroxide solution to bring the pH, in equilibrium, to 6.6. The separated aqueous layer is then freeze-dried to yield about 45 mg. of the pure sodium salt.

*Example 2*

7 - (BENZYLOXYCARBONYLGLYCYLAMINO) - DESACETYL-CEPHALOSPORANIC ACID, SODIUM SALT (FORMULA I, R AND B ARE HYDROGEN, R₁ IS BENZYLOXYCARBONYL, $m$ AND $n$ ARE ZERO)

To a solution of 50 mg. of 7-(benzyloxycarbonylglycylamino)cephalosporanic acid, sodium salt, in 3.0 ml. of water, kept at 30°, there is added 0.25 ml. of orange peel (citrus) acetyl esterase solution [Jeffery et al., Biochem. J., 81, 591 (1961)] and the pH is kept constant at 6,6 by automatic addition of N/10 sodium hydroxide solution. After an uptake of 0.93 equivalent of sodium hydroxide, the mixture is freeze-dried to yield the crude 7-(benzyloxycarbonylglycylamino) - desacetly - cephalosporanic acid, sodium salt, which is then further purified by ion exchange chromatography.

*Example 3*

7 - (BENZYLOXYCARBONYLGLYCYLAMINO) - DESACETYL-PHENYLACETYL-CEPHALOSPORANIC ACID, SODIUM SALT (FORMULA I, R IS HYDROGEN, R₁ IS BENZYLOXYCARBONYL, B IS PHENYLACETYL, $m$ AND $n$ ARE ZERO)

To a suspension of 80 mg. of 7-(benzyloxycarbonylglycylamino)-desacetyl-cephalosporanic acid, sodium salt, in 0.5 ml. of anhydrous dimethylformamide, there is added 40 mg. of phenylacetyl chloride and the mixture is stirred for eight hours at room temperature. The mixture is then evaporated in high vacuum and the residue, after being extracted several times with dry ether, is dissolved in a pH 5.0 pyridine-acetate buffer and added to an Amberlite XE–58 column (acetate form). Elution is carried out with the same buffer and, after separation of a lactonic by-product, the fraction containing the phenylacetylated product are collected. The residue obtained from the freeze-drying of these fractions is redissolved in water. Acidification to pH 2.2, extraction with methyl isobutyl ketone and treatment of the dried organic layer with a sodium ethylhexoate solution in the same solvent yields the crystalline sodium salt of 7-benzyloxycarbonylglycylamino)-desacetylphenylacetyl-cephalosporanic acid, sodium salt.

*Example 4*

7 - (p - TOLUENESULFONYL - β - ALANYLAMINO)CEPHALOSPORANIC ACID, SODIUM SALT (FORMULA I, R IS HYDROGEN, R₁ IS p-TOLUENESULFONYL, B IS ACETYL, $m$ IS ONE, $n$ IS ZERO)

p-Toluenesulfonyl-β-alanine is converted to its p-nitrophenyl ester (m.p. about 98–99°) by the method of Bodanszky et al. (Biolchemical Preparations, vol. 9, p. 110, 1962, John Wiley & Sons, New York City). Substituting an equivalent amount of this p-nitrophenyl ester for the benzyloxycarbonylglycine p-nitrophenyl ester in Example 1, results in the formation of the sodium salt of p-toluenesulfonyl - β - alanylaminocephalosporanic acid. This compound can be converted to its desacetyl and desacetyl-phenylacetyl derivatives by the processes of Examples 2 and 3.

*Example 5*

7 - (α - ACETYLAMINOBUTYRYLAMINO)CEPHALOSPORANIC ACID, MAGNESIUM SALT (FORMULA I, R IS HYDROGEN, R₁ AND B ARE ACETYL, $m$ IS TWO, $n$ IS ZERO)

27.2 mg. of 7-aminocephalosporanic acid and 50 mg. of magnesium carbonate are stirred under 4 ml. of dioxane for two hours at room temperature. To the filtered solution there is added 18 mg. of α-acetylaminobutyryl chloride and the stirring is continued for two more hours. Evaporation yields the α-acetylaminobutyrylamino-cephalosparanic acid, magnesium double salt with magnesium chloride.

*Example 6*

7- (BENZOYLGLYCYLGLYCYLAMINO)CEPHALOSPORANIC ACID, N-ETHYLMORPHOLINIUM SALT (FORMULA I, R IS HYDROGEN, R₁ IS BENZOYL, B IS ACETYL, $m$ IS ZERO, $n$ IS ONE)

A mixture of 27.2 mg. of 7-aminocephalosparanic acid, 23.3 mg. of benzoylglcylglycyl azide (M.P. 162°) and 25 mg. of N-ethylmorpholine in 2.0 ml. of dimethylformamide is stirred for 20 hours at 10°, then evaporated to dryness in high vacuum to yield the desired product.

*Example 7*

7 - (BENZYLOXYCARBONYLTRIGLYCYLAMINO)CEPHALOSPORANIC ACID, N-ETHYLPIPERIDINIUM SALT (FORMULA I, R IS HYDROGEN, R₁ IS BENZYLOXYCARBONYL, B IS ACETYL, $m$ IS ZERO, $n$ IS TWO)

Benzyloxycarbonyltriglycine is converted to its p-nitrophenyl ester (M.P. 219–220°) by the method of Bodanszky et al., supra. Substituting an equivalent amount of this p-nitrophenyl ester for that used in Example 1 and 0.013 ml. of N-ethylpiperidine for the triethylamine, a good yield of the N-ethylpiperidinum salt of 7-(benzyloxycarbonyltriglycylamino)cephalosporanic acid is obtained.

*Example 8*

7 - (BENZYLOXYCARBONYL-L-LEUCYLAMINO)CEPHALOSPORANIC ACID, TRIETHYLAMMONIUM SALT (FORMULA I, R IS PRIM.-ISOBUTYL, R₁ IS BENZYLOXYCARBONYL, B IS ACETYL, $m$ AND $n$ ARE ZERO)

A mixture of 27 mg. of 7-aminocephalosporanic acid, 40 mg. of benzyloxycarbonyl-L-leucine p-nitrophenyl ester (M.P. 95°), 0.014 ml. of triethylamine in 0.50 ml. of dimethylformamide is allowed to stand overnight at room temperature. On addition of 5 ml. of dry ether, an excellent yield of the desired triethylammonium salt is obtained, which is converted to the sodium salt as described in Example 1.

*Example 9*

7 - (BENZYLOXYCARBONYL - L - LEUCYLAMINO)DESACETYL-CAPROYLCEPHALOSPORANIC ACID, SODIUM SALT (FORMULA I, R IS PRIM.-ISOBUTYL, $R_1$ IS BENZYLOXYCARBONYL, B IS CAPROYL, $m$ AND $n$ ARE ZERO)

Substituting an equivalent amount of 7-(benzyloxycarbonyl-L-leucylamino)cephalosporanic acid, sodium salt, for the 7-(benzyloxycarbonylglycylamino)cephalosporanic acid, sodium salt, in the procedure of Example 2, desacetylation is carried out. The crude desacetyl compound is then treated with an equivalent amount of caproyl chloride to yield, under the conditions of Example 3, 7-(benzyloxycarbonyl-L-leucylamino)-desacetyl - caproylcephalosporanic acid, sodium salt.

*Example 10*

7 - (BENZYLOXYCARBONYLGLYCYL - L - PHENYLALANYL)CEPHALOSPORANIC ACID, TRIETHYLAMMONIUM SALT (FORMULA I, R IS BENZYL AND THE OTHER HYDROGEN, $R_1$ IS BENZYLOXYCARBONYL, B IS ACETYL, $m$ IS ZERO, $n$ IS ONE)

A mixture of 27 mg. of 7-aminocephalosporanic acid, 56 mg. of benzyloxycarbonylglycyl-L-phenylalanine p-nitrophenyl ester and 0.014 ml. of triethylamine in 0.50 ml. of dimethylformamide is allowed to stand overnight at room temperature. Addition of 5 ml. of dry ether precipitates the desired triethylammonium salt.

*Example 11*

7 - (p - NITROBENZYLOXYCARBONYL - L - HISTIDYLAMINO)CEPHALOSPORANIC ACID, TRIETHYLAMMONIUM SALT (FORMULA I, R IS IMIDAZOLYLMETHYL, $R_1$ IS p-NITROBENZYLOXYCARBONYL, B IS ACETYL, $m$ AND $n$ ARE ZERO)

A mixture of 27 mg. of 7-aminocephalosporanic acid, 50 mg. of p-nitrobenzyloxycarbonyl-L-histidine p-nitrophenyl ester (prepared from the acid by the method of Bodanszky et al., supra) and 0.014 ml. of triethylamine in 0.50 ml. of dimethylformamide is kept at room temperature for 30 hours. The desired triethylammonium salt separates on addition of 5.0 ml. of dry ether.

*Example 12*

7 - (ETHOXYCARBONYL - L - METHIONYLAMINO)CEPHALOSPORANIC ACID, TRIETHYLAMMONIUM SALT (FORMULA I, R IS $\beta$-METHYLTHIOETHYL, $R_1$ IS ETHOXYCARBONYL, B IS ACETYL, $m$ AND $n$ ARE ZERO)

A mixture of 27 mg. of 7-aminocephalosporanic acid, 24 mg. of ethoxycarbonyl-L-methionine p-nitrophenyl ester (prepared from the acid by the method of Bodanszky et al., supra) and 0.014 ml. of triethylamine in 0.50 ml. of dimethylformamide is kept at room temperature for 26 hours, whereafter the desired salt is precipitated by the addition of 6 ml. of ether.

*Example 13*

7 - (BENZYLOXYCARBONYLGLYCYLAMINO) - DESACETYL - BENZOYL - CEPHALOSPORANIC ACID, SODIUM SALT (FORMULA I, R IS HYDROGEN, $R_1$ IS BENZYLOXYCARBONYL, B IS BENZOYL, $m$ AND $n$ ARE ZERO)

Substituting an equivalent amount of benzoyl chloride for the phenylacetyl chloride in Example 3 yields the desired desacetyl-benzoyl compound.

*Example 14*

7 - (CYCLOPENTYLOXYCARBONYL - $\beta$ - ALANYL - L-PHENYLALANYL)AMINOCEPHALOSPORANIC ACID, SODIUM SALT (FORMULA I, R IS CYCLOPENTYLOXYCARBONYL, ONE R IS HYDROGEN, THE OTHER BENZYL, ONE $m$ IS 1, THE OTHER ZERO AND $n$ IS 1)

A mixture of 348 mg. of cyclopentyloxycarbonyl-$\beta$-alanyl-L-phenylalanine and 162 mg. of N,N'-carbonyldimidazole in 2 ml. of dry tetrahydrofuran is stirred at room temperature. After 30 minutes, when the formation of the acid imidazolide is essentially complete (as judged from the ceasing of the carbon dioxide evolution) a solution of 272 mg. of 7-aminocephalosporanic acid in 2.0 ml. of 0.5 N sodium hydroxide solution is added, and the mixture is allowed to stand for an additional 3 hours. The pH is then adjusted to 2.0 and the acid product is extracted into methyl isobutyl ketone. Addition of a methyl isobutyl ketone solution of sodium ethylhexoate to the former solution yields the solid sodium salt.

*Example 15*

7 - (p - TOLUENESULPHONYL-L-ISOLEUCYL-L-LEUCYL-AMINO)CEPHALOSPORANIC ACID, SODIUM SALT (FORMULA I, R IS p-TOLUENESULPHONYL, ONE R IS SEC.-BUTYL, THE OTHER IS ISOBUTYL, $m$ IS ZERO AND $n$ IS 1)

A mixture of 39.8 mg. of p-toluenesulphonyl-L-isoleucyl-L-leucine, 13.7 mg. of isobutyl chlorocarbonate, 10.2 mg. of triethylamine and 2 ml. of tetrahydrofuran is stirred at —5° for 2 hours. A solution of 27.2 mg. of 7-aminocephalosporanic acid in 1 ml. of 0.1 N sodium hydroxide solution is then added. After an additional 5 hours, the mixture is acidified to pH 2.0 and extracted with methyl isobutyl ketone. The solid sodium salt is obtained by addition of a methyl isobutyl ketone solution of sodium ethylhexoate to the washed and dried methyl isobutyl ketone layer.

This invention may be variously otherwise embodied within the scope of the appened claims.

What is claimed is:

1. A compound selected from the group consisting of 7-acyl amides of compounds of the formula

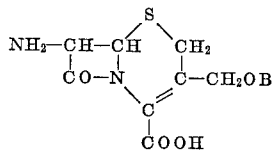

and salts thereof with non-toxic bases, wherein B is selected from the group consisting of hydrogen and the acyl radical of a hydrocarbon carboxylic acid of less than twelve carbon atoms, and the 7-acyl group is (a) the acid residue of an amino acid selected from the group consisting of alanine, arginine, aspartic acid, cysteine, diiodotyrosine, glutamic acid, glycine, histidine, hydroxylsine, hydroxyproline, isoleucine, leucine, lysine, methionine, phenylalanine, proline, serine, threonine, thyroxine, tryptophan, tyrosine, and valine, the terminal amino group of which is protected by a group selected from the group consisting of the acyl radical of a hydrocarbon carboxylic acid of less than twelve carbon atoms, the acyl radical of a hydrocarbon sulfonic acid of less than twelve carbon atoms, and the acyl radical of a half ester of carbonic acid with a hydrocarbon of less than twelve carbon atoms, or (b) a dipeptide or tripeptide obtained from two or three of said amino acids and having a terminal amino group which is protected by one of said protective acyl radicals.

2. The protected amino acid amides of claim 1, wherein B is acetyl.

3. The protected dipeptide amides of claim 1, wherein B is acetyl.

4. The protected tripeptide amides of claim 1, wherein B is acetyl.

5. A salt of 7-(benzyloxycarbonylglycylamino)cephalosporanic acid with a non-toxic base.

6. A salt of 7-(p-toluenesulfonyl-$\beta$-alanylamino)cephalosporanic acid with a non-toxic base.

7. A salt of 7-(benzoylglycylglycylamino)cephalosporanic acid with a non-toxic base.

8. A salt of 7-(benzyloxycarbonyltriglycylamino)cephalosporanic acid with a non-toxic base.

9. A salt of 7-(benzyloxycarbonyl-L-leucylamino)cephalosporanic acid with a non-toxic base.

References Cited by the Examiner

UNITED STATES PATENTS 2,941,995    6/1960    Doyle et al. _____ 260—239
3,173,916    3/1965    Schull et al. _____ 260—243

OTHER REFERENCES

Journal of the American Medical Association, page 466, May 24, 1958.

Morton: The Chemistry of Heterocyclic Compounds, page VI of the preface (1946).

ALEX MAZEL, *Primary Examiner.*

NICHOLAS S. RIZZO, JAMES W. ADAMS, Jr.,
*Assistant Examiners.*